(12) United States Patent
Gupta et al.

(10) Patent No.: US 8,209,615 B2
(45) Date of Patent: Jun. 26, 2012

(54) APPARATUS AND METHODS OF LINKING TO AN APPLICATION ON A WIRELESS DEVICE

(75) Inventors: Binita Gupta, San Diego, CA (US); An Mei Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1010 days.

(21) Appl. No.: 11/941,960

(22) Filed: Nov. 18, 2007

(65) Prior Publication Data

US 2008/0134049 A1 Jun. 5, 2008

Related U.S. Application Data

(60) Provisional application No. 60/867,000, filed on Nov. 22, 2006.

(51) Int. Cl.
*G06F 3/00* (2006.01)

(52) U.S. Cl. ............ 715/738; 715/760; 715/205

(58) Field of Classification Search ............ 715/738, 715/760, 864, 205, 208; 709/217, 219, 227, 709/249
See application file for complete search history.

(56) References Cited

U.S. PATENT DOCUMENTS

| 7,200,387 B1* | 4/2007 | Ephraim et al. | 455/418 |
| 7,437,149 B1* | 10/2008 | Papineau et al. | 455/418 |
| 2002/0198999 A1* | 12/2002 | Smith et al. | 709/227 |
| 2003/0182305 A1* | 9/2003 | Balva et al. | 707/103 R |
| 2003/0233451 A1* | 12/2003 | Ludvig et al. | 709/225 |
| 2004/0064564 A1* | 4/2004 | Belkin | 709/227 |
| 2005/0278651 A1* | 12/2005 | Coe et al. | 715/779 |
| 2006/0294196 A1* | 12/2006 | Feirouz et al. | 709/217 |
| 2007/0276947 A1* | 11/2007 | Panattu et al. | 709/227 |
| 2008/0254780 A1* | 10/2008 | Kuhl et al. | 455/418 |

FOREIGN PATENT DOCUMENTS

| CN | 1391755 A | 1/2003 |
| JP | 10164256 A | 6/1998 |
| JP | 2002108754 A | 4/2002 |
| JP | 2003510903 A | 3/2003 |
| JP | 2005340941 A | 12/2005 |
| WO | 0122680 | 3/2001 |
| WO | 05106653 | 11/2005 |

OTHER PUBLICATIONS

Crocker D et al: "Augmented BNF for Syntax Specifications: ABNF: RFC 4234, txt." IETF Standard, Internet Engineering Task Force, IETF, CH, Oct. 1, 2005, XP015041816.
International Search Report—PCT/US2007/085151. International Search Authority—European Patent Office—Jul. 23, 2008.
Written Opinion—PCT/US2007/085151. International Search Authority—European Patent Office—Jul. 23, 2008.

(Continued)

*Primary Examiner* — Weilun Lo
*Assistant Examiner* — Rashedul Hassan
(74) *Attorney, Agent, or Firm* — Ryan N. Farr

(57) ABSTRACT

The described apparatus and methods define a predetermined scheme or syntax for an application-specific Universal Resource Identifier (URI) operable to deep link to a specified point, portion, or view of a target client application executable on a wireless device. Accordingly, the described application-specific URI can be used to deep link from one point to another in the same client application, or to deep link from one client application to another client application.

37 Claims, 6 Drawing Sheets

OTHER PUBLICATIONS

IPRP, PCT/US2007/085151, International Bureau of WIPO, Jun. 4, 2009.

Network Working Group; Request for Comments: 3986 STD: 66 Updates 1738 Obsoletes: 2732, 2396, 1808 Category: Standards Track T. Berners-Lee; W3C/MIT R. Fielding Day Sotware L. Masinter Adobe Systems Jan. 2005 Uniform Resource Identifier (URI): Generic Syntax.

Network Working Group; Request for Comments: 3987 Category: Standards Track M. Duerst W3C M. Suignard Microsoft Corporation Jan. 2005 Internationalized Resource Identifiers (IRIs).

Network Working Group; Request for Comments: 4395 Obsoletes: 2717, 2718 BCP: 115 Category: Best Current Practices T. Hansen AT &T Laboratories T. Hardie Qualcomm Inc. L Masinter Adobe Systems Feb. 2006.

\* cited by examiner

APPARATUS AND METHODS OF LINKING TO AN APPLICATION ON A WIRELESS DEVICE

CLAIM OF PRIORITY UNDER 35 U.S.C. §119

The present application for patent claims priority to Provisional Application No. 60/867,000 entitled "Mechanism to Enable Deep Linking to Applications on Mobile Handsets" filed Nov. 22, 2006, and assigned to the assignee hereof and hereby expressly incorporated by reference herein.

BACKGROUND

1. Field

The described aspects relate to wireless communication devices, and more specifically, to linking to an application on a wireless communication device.

2. Background

A Universal Resource Identifier (URI) that includes a string of characters can be used to identify or name a resource to enable interactions with representations of the resource over a network. A form of a URI is a Universal Resource Locator (URL), which additionally includes an identification of a location of the resource. For example, the URL http://www.qualcomm.com is a URI that identifies a resource, the home page of QUALCOMM Incorporated, and identifies that a representation of the resource, such as corresponding Hypertext Markup Language (HTML) code, may be obtained using a Hypertext Transfer Protocol (http) from a network host on the World Wide Web (www) named www.qualcomm.com. Thus, in one application, a web browser on a computer uses a URL to retrieve representations of web pages from network-based servers. Accordingly, such URLs have a syntax designed for use to retrieve web pages from the World Wide Web using specific protocols.

Such web-based URIs and URLs are not ideal for usage by mobile wireless devices, such as cellular telephones, wherein throughput may be relatively limited and wherein a size of data packets used to exchange messages is relatively small. For example, such URIs and URLs include a plurality of spaces and characters, and are relatively lengthy compared to data components of wireless device protocol messages.

Thus, improved URIs for use on mobile wireless devices are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of linking to an application on a wireless device comprises generating a first output on a user interface of a wireless device based on execution of a first client application on the wireless device. The first output comprises an application-specific universal resource identifier having a predetermined syntax comprising an application scheme identifier and command data. The application scheme identifier corresponds to a target client application, and the command data represents at least one command for execution by the target client application. Further, the method includes receiving an input selecting the application-specific universal resource identifier. Also, the method includes determining if the application scheme identifier of the selected application-specific universal resource identifier corresponds to a client application registered with the wireless device. Additionally, the method includes generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

In another aspect, at least one processor configured to link to an application on a wireless device comprises a first module for generating a first output on a user interface of a wireless device based on execution of a first client application on the wireless device. The first output comprises an application-specific universal resource identifier having a predetermined syntax comprising an application scheme identifier and command data. The application scheme identifier corresponds to a target client application, and the command data represents at least one command for execution by the target client application. The at least one processor further includes a second module for receiving an input selecting the application-specific universal resource identifier, and a third module for determining if the application scheme identifier of the selected application-specific universal resource identifier corresponds to a client application registered with the wireless device. Additionally, the at least one processor includes a fourth module for generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

In a further aspect, a computer program product configured to link to an application on a wireless device comprises a computer-readable medium having at least one instruction. The computer-readable medium includes at least one instruction for causing a computer to generate a first output on a user interface of a wireless device based on execution of a first client application on the wireless device. The first output comprises an application-specific universal resource identifier having a predetermined syntax comprising an application scheme identifier and command data. The application scheme identifier corresponds to a target client application. And, the command data represents at least one command for execution by the target client application. Further, the computer-readable medium includes at least one instruction for causing the computer to receive an input selecting the application-specific universal resource identifier, and at least one instruction for causing the computer to determine if the application scheme identifier of the selected application-specific universal resource identifier corresponds to a client application registered with the wireless device. Additionally, the computer-readable medium includes at least one instruction for causing the computer to generate a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

In yet another aspect, an apparatus configured to link to an application on a wireless device comprises means for generating a first output on a user interface of a wireless device based on execution of a first client application on the wireless device, wherein the first output comprises an application-specific universal resource identifier having a predetermined syntax comprising an application scheme identifier and command data. The application scheme identifier corresponds to a target client application. The command data represents at least one command for execution by the target client application. Further, the apparatus includes means for receiving an input selecting the application-specific universal resource identifier, and means for determining if the application scheme identifier of the selected application-specific universal resource identifier corresponds to a client application registered with the wireless device. Additionally, the apparatus includes means for generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

In another aspect, a wireless device comprises a user interface and a memory comprising at least a first client application, a registry and a list representing valid command data. The registry identifies at least one application scheme identifier corresponding to at least one client application. Further, the wireless device includes a processor in communication with the user interface and the memory, wherein the processor is operable to execute the first client application to generate a first output on the user interface. The first output comprises an application-specific universal resource identifier having a predetermined syntax comprising an application scheme identifier and command data, wherein the application scheme identifier corresponds to a target client application, and wherein the command data represents at least one command for execution by the target client application. The user interface is further operable to receive an input selecting the application-specific universal resource identifier. Also, the processor is further operable to determine if the application scheme identifier of the selected application-specific universal resource identifier corresponds to any client application in the registry. The processor is further operable to determine if the command data is valid if the application scheme identifier of the selected application-specific universal resource identifier corresponds to any client application in the registry. Additionally, the processor is further operable to execute an identified client application according to the command data to generate a second output on the user interface if the identified client application corresponds to the selected application scheme identifier in the registry and if the command data is valid, wherein the second output corresponds to a predetermined point in the identified client application.

In an aspect, a method of generating a uniform resource identifier (URI) comprises generating text indicating a scheme name portion that corresponds to a target client application. Further, the method includes appending a colon to the text indicating the scheme name portion, and generating a question mark (?) followed by an application linkage portion after the colon. The application linkage portion corresponds to a predetermined point in the target client application corresponding to the scheme name portion.

In another aspect, at least one processor configured to generate a uniform resource identifier (URI) comprises a first module for generating text indicating a scheme name portion, wherein the scheme name portion corresponds to a target client application, a second module for appending a colon (:) to the text indicating the scheme name portion, and a third module for generating a question mark (?) followed by an application linkage portion after the colon, wherein the application linkage portion corresponds to a predetermined point in the target client application corresponding to the scheme name portion.

In a further aspect, a computer program product for generating a URI comprises a computer readable medium comprising at least one instruction. The computer-readable medium includes at least one instruction causing a computer to generate text indicating a scheme name portion, wherein the scheme name portion corresponds to a target client application. Further, the computer-readable medium includes at least one instruction causing the computer to append a colon to the text indicating the scheme name portion. Additionally, the computer-readable medium includes at least one instruction causing a computer to generate a question mark (?) followed by an application linkage portion after the colon, wherein the application linkage portion corresponds to a predetermined point in the target client application corresponding to the scheme name portion.

In yet another aspect, an apparatus for generating a URI, comprises means for generating text indicating a scheme name portion, wherein the scheme name portion corresponds to a target client application, means for appending a colon to the text indicating the scheme name portion, and means for generating a question mark (?) followed by an application linkage portion after the colon, wherein the application linkage portion corresponds to a predetermined point in the target client application corresponding to the scheme name portion.

In an aspect, a URI comprises a scheme name portion that corresponds to a target client application. Further, the URI includes a colon appended to the scheme name portion, and a question mark (?) following the colon. Additionally, the URI includes an application linkage portion following the question mark, wherein the application linkage portion corresponds to a predetermined point in the target client application corresponding to the scheme name portion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The apparatus and methods described herein define a relatively compact and efficient scheme or syntax for an application-specific Universal Resource Identifier (URI) that enables linking to a specified portion of an application on a wireless device. In one aspect, the described application-specific URI defines a predetermined point within a client application executable on a mobile wireless communication device, and enables linking to the predetermined point. In some aspects, the predetermined point is one of a plurality of predetermined points corresponding to execution of the client application on the wireless device.

For example, the application-specific URI may be included in an output, such as a graphical user interface, menu, or view, generated on the wireless device by a client application. Based on receiving a selection of the application-specific URI, one or more aspects described herein enable linking to a predetermined point in a target client application as defined by the application-specific URI. In one aspect, the application-specific URI enables linking between points of the same application, while in another aspect the linking is between points within two different client applications. In this manner, by operating on the application-specific URI, a wireless device is enabled to switch from a first output including the application-specific URI to a new output generated in the manner defined by the application-specific URI. In other words, the application-specific URI defines and enables deep linking to a predetermined point in a client application. Thus, the described aspects provide an efficient mechanism for moving among or between specific points in one or more client applications on a wireless device.

Figure 1:
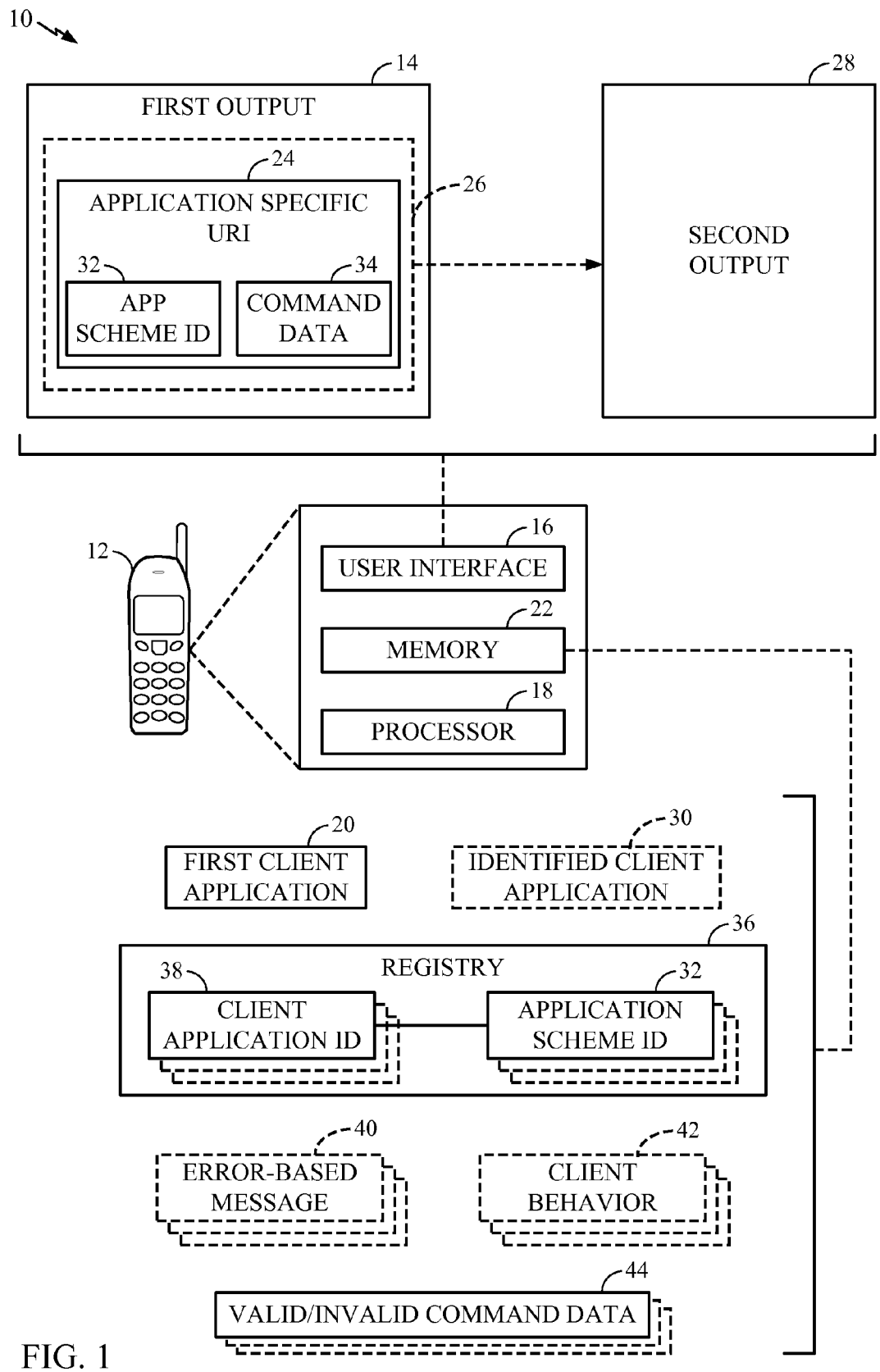
FIG. 1 is a schematic diagram of one aspect of a system for linking to an application on a wireless device.

Referring to FIG. 1, one aspect of a system 10 of deep linking includes a wireless device 12 operable to generate a first output 14 on a user interface 16, where first output 14 is based on execution by a processor 18 of a first client application 20 resident in a memory 22 of wireless device 12. First output 14, which may be represented by but is not limited to, a graphical user interface, a menu, a view, or any output generated by first client application 20, additionally includes an application-specific URI 24 defined according to a predetermined scheme or syntax as disclosed herein. In particular, according to the predetermined scheme or syntax, application-specific URI 24 defines a target client application and a predetermined point within the target client application, thereby enabling linking to the predetermined point in the target client application. As such, the operation of linking, as indicated by dashed line 26, enabled by application-specific URI 24 causes the production of second output 28 by user interface 16. In some aspects, second output 28 is based on execution by processor 18 of an identified client application 30 resident in memory 22 of wireless device 12, wherein identified client application 30 corresponds to the target client application defined by application-specific URI 24 and wherein at least some characteristics of second output 28 are defined by application-specific URI 24. In other aspects, similar to first output 14, second output 28 is generated by first client application 20, but with characteristics defined at least in part by application-specific URI 24.

In one aspect combinable with the above-described aspect, processor 18 or another component of wireless device 12 includes logic operable to receive an input, such as a user selection of application-specific URI 24 via user interface 16, and further operable to respond to the input by attempting to link to the specified point in the target client application. In particular, processor 18 or other component of wireless device 12 is operable to parse application-specific URI 24 to determine an application scheme identifier (ID) 32 corresponding to a target client application, and to determine command data 34 corresponding to the desired point of linking to the target client application. Further, processor 18 or other component is operable to access a registry 36, such as a database, that stores known relationships between one or more application scheme IDs 32 and one or more client applications or client application identifiers (IDs) 38. In particular, in some aspects, a client application operable on wireless device 12 may register with wireless device 12 to be associated with an application scheme or application scheme ID 32. As such, based on checking registry 36, the logic of processor 18 or other wireless device component is operable to determine if the target client application corresponding to application scheme ID 32 of application-specific URI 24 is a client application resident on or known to wireless device 12, referred to as identified client application 30.

If the target client application is identified in registry 36, then the logic of processor 18 or other wireless device component is operable to forward command data 34 to the corresponding identified client application 30 for processing to generate second output 28.

In one aspect combinable with the above-described aspects, if the target client application is not identified in registry 36, then the logic of processor 18 or other wireless device component is operable to generate an error-based message 40 according to a predetermined client behavior 42. Error-based message 40 and predetermined client behavior 42 may vary depending on the nature of the determined error in application-specific URI 24. Thus, in such aspect, second output 28 responsive to operating on application-specific URI 24 may be error-based message 40 generated by processor 18 or other wireless device component, as opposed to second output 28 being an output associated with the target client application.

In a further aspect combinable with any of the above-described aspects, the logic of processor 18 or other wireless device component, including identified client application 30, may be further operable to determine a validity of command data 34. For example, processor 18 or other wireless device component may be operable to access valid or invalid command data 44, which may be stored in memory 22. Valid or invalid command data 44 may define one or more, or any combination of, valid command data and/or invalid command data, as will be explained in more detail below. In any case, if command data 34 is determined to be valid, then identified client application 30 is executed based on command data 34 to generate second output. If command data 34 is determined to be invalid, then the logic of processor 18 or other wireless device component is operable to generate an error-based message 40 according to a predetermined client behavior 42. Error-based message 40 and predetermined client behavior 42 may vary depending on the nature of the determined error in application-specific URI 24.

Thus, system 10 provides apparatus and methods of linking to a specific point in an application on a wireless device by providing an application-specific URI 24 having a predetermined syntax that includes a definition of a target client application and command data executable by the target client application to enable generation of an output defining the specific point.

Figure 2:
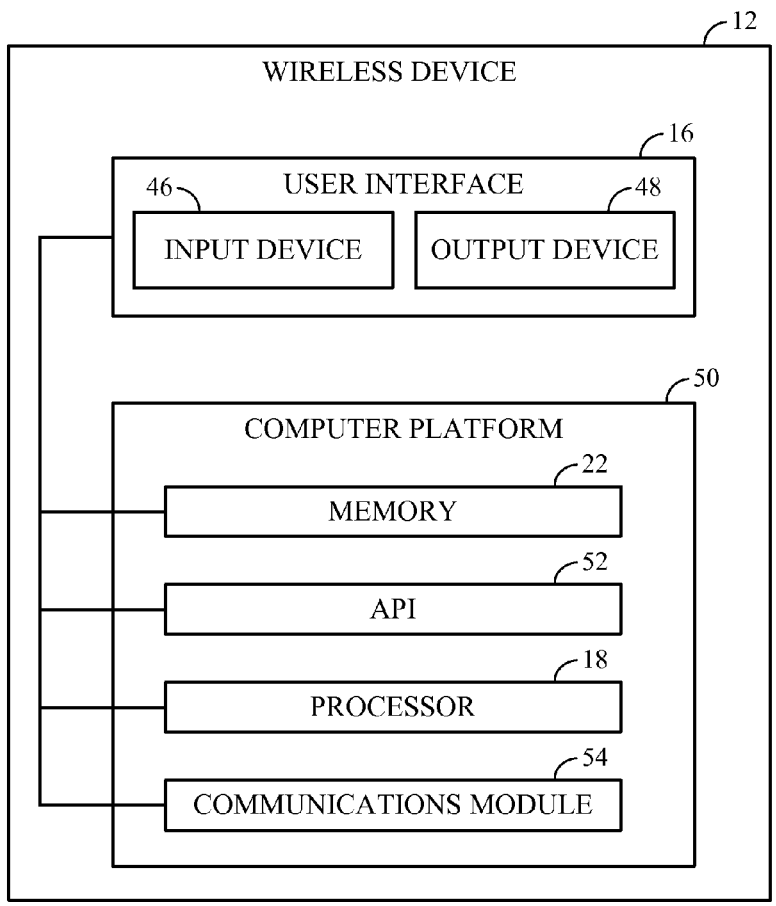
FIG. 2 is a schematic diagram of one aspect of the wireless device of FIG. 1.

Referring to FIG. 2, wireless device 12 may include any type of mobile, wireless communication device. For example, wireless device 12 may include, but is not limited to, a cell phone, a personal data assistant (PDA), a portable gaming device, etc.

User interface 16 of wireless device 12 may include an input device 46 operable to generate and/or receive an input into the device, and an output device 48 operable to generate and/or present information for consumption by a user of the device. For example, input device 46 may include at least one device such as a keypad and/or keyboard, a mouse, a touchscreen display, a microphone in association with a voice recognition module, etc. In certain aspects, input device 46 may provide for user input of a request for content or for user input of marking information. Further, for example, output device 48 may include a display, an audio speaker, a haptic feedback mechanism, etc. Output device 48 may generate a graphical user interface, a sound, a feeling such as a vibration, etc.

Further, wireless device 12 may include a computer platform 50 operable to execute applications to provide functionality to the device, and which may further interact with user interface 16. Computer platform 50 may include memory 22, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 22 may include active memory and storage memory, including an electronic file system and any secondary and/or tertiary storage device, such as magnetic media, optical media, tape, soft and/or hard disk, and removable memory components.

Further, computer platform 50 may also include processor 18, which may be an application-specific integrated circuit (ASIC), or other chipset, processor, logic circuit, or other data processing device.

Further, processor 18 or other logic such as ASIC may execute an application programming interface (API) layer 52 that interfaces with any resident software components or client applications, such as voice call modules, data call modules, and/or media-related modules in memory 22. API 52 may be a runtime environment executing on the respective communication device. One such runtime environment is Binary Runtime Environment for Wireless® (BREW®) software developed by Qualcomm Incorporated of San Diego, Calif. Other runtime environments may be utilized that, for example, operate to control the execution of applications on wireless computing devices. In particular, API or runtime environment 52 may include the logic operable to handle the processing of a user-selected application-specific API 24, including the parsing and error checking described herein.

Additionally, in some optional aspects, processor 18 may include various processing subsystems embodied in hardware, firmware, software, and combinations thereof that enable the functionality of wireless device 12 and operability on a communications network. For example, processing subsystems allow for initiating and maintaining communications, and exchanging data, with other networked devices as well as within and/or among components of wireless device 12. In one aspect, such as in a cellular telephone, processor 18 may include one or a combination of processing subsystems, such as sound, non-volatile memory, file system, transmit, receive, searcher, layer 1, layer 2, layer 3, main control, remote procedure, handset, power management, diagnostic, digital signal processor, vocoder, messaging, call manager, BLUETOOTH system, BLUETOOTH LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. Thus, the processing subsystems of processor 18 may include any subsystem components that interact with applications executing on computer platform 50.

Computer platform 50 may further include a communications module 54, which enables communications among the various components of wireless device 12, and between wireless device 12 and any other communication devices via a shared communications pathway. Communications module 54 may be embodied in hardware, firmware, software, and/or combinations thereof, and may further include all protocols for use in intra-device and inter-device communications.

Communications module 54 enables wireless device 12 to be operable on one or more of any type of communications network. The communications network may comprise any data and/or voice communications network. For example, the communications network may comprise all or some portion of any one or any combination of a wired or wireless telephone network; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.xx network; a packet data network; a data network; an Internet Protocol (IP) Multimedia Subsystem (IMS) network; a public switched telephone network; a public heterogeneous communications network, such as the Internet; a private communications network; a multicast network such as a Forward Link Only (FLO) network, including the MediaFLO™ System available from Qualcomm Incorporated of San Diego, Calif.; a digital video broadcasting (DVB) network, such as DVB-S for satellite, DVB-C for cable, DVB-T for terrestrial television, DVB-H for terrestrial television for handhelds; and a land mobile radio network.

Further, communications module 54 may support one, or any combination, of analog and/or digital networks/technologies, such as code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1x) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

With continued reference to FIGS. 1 and 2, memory 22 may store one or more client applications executable by processor 18. Client applications, such as first client application 20 and identified client application 30, include any type of software application, module, or component. For example, a client application may include, but is not limited to, a voice call application, a text messaging application, a multimedia application, a media player application, a datacast application, a camera application, a personal information manager application, a content acquisition application, a business application, an enterprise application, etc. Further, client applications corresponding with the target client application defined by application-specific URI 24 have a plurality of points or states that can be represented or generated as outputs on user interface 16. As such, these points or states may be specified, defined, characterized, or partially enabled based on command data 34. For example, a specified point or state of a client application may be one of a plurality of menus, views, etc., that are able to be generated by user interface 16 based on execution of a respective client application using command data 34. Additionally, the predetermined point or state of client application defined by application-specific URI 24 includes a dynamic point or state modifiable based on command data 34. For example, as is discussed below, command data 34 includes at least one or any combination of one or more commands, or one or more attributes associated with each command, or one or more values associated with each attribute. As such, in some aspects, command data 34 comprises a variable input into the target client application that correspondingly allows the predetermined point or state of the referenced target client application to include one or more variable or dynamic components based on the specified command data 34. In other words, a client application, such as first client application 20 and identified client application 30, is an application operable to recognize and execute a predetermined set of commands, in some cases based on corresponding attributes and values, to dynamically generate an output on user interface 16. Correspondingly, application-specific URI 24 is able to define one or more of the respective set of commands, and in some cases one or more corresponding attributes and values. As such, second output 28 generated by identified client application 30 is a dynamic output, generated based on execution of a command by identified client application 30, as opposed to a reconstruction of a static, non-variable representation such as a web page. Thus, client application is operable to receive parsed portions of application-specific URI 24 to generate an output corresponding to a predetermined point or state of the client application, thereby allowing deep linking into the respective client application.

Figure 3:
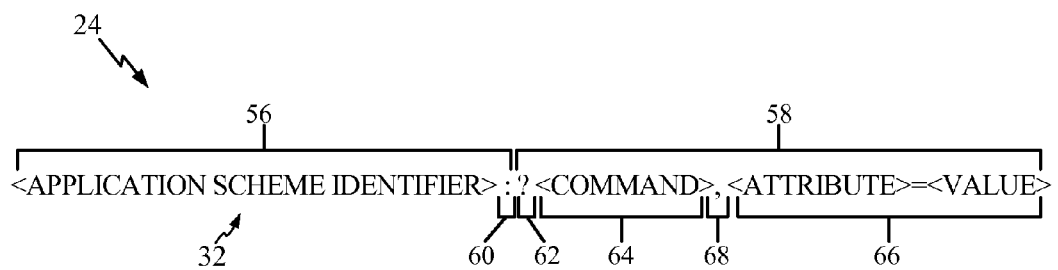
FIG. 3 is a diagram of an application-specific Universal Resource Identifier (URI) scheme for use in the system of FIG. 1.

Referring to FIG. 3, according to one aspect, the predetermined syntax of application-specific URI 24 includes a scheme name portion 56 followed by a specified application linkage point portion 58. Scheme name portion 56 includes application scheme identifier 32 followed by a predetermined delimiter 60, such as a semi-colon (;). Application scheme identifier 32 may be any type of identifier that enables the corresponding target application to be determined. Specified application linkage point portion 58 includes a predetermined delimiter 62, such as a question mark (?), followed command data 34, which includes one or more commands 64 separated from one or more attribute-value pairs 66 by a predetermined delimiter 68, such as a comma (,). Each command 64 that is valid is executable with each attribute and attribute value of attribute-value pair 66 by the target client application as defined by application scheme identifier 32. As such, application-specific URI 24 defines a specific point or state of the target client application to be generated by as an output on user interface 16.

Table 1 illustrates an Augmented Backus-Naur Form (ABNF) representing the predetermined scheme of application-specific URI 24. The ABNF of Table 1 includes definitions of scheme components and corresponding comments (following the "//") elaborating on the scheme components.

TABLE 1

ABNF Representing an Exemplary Predetermined Scheme of Application-Specific URI

```
app-uri = app-scheme ":" app-data
app-scheme = ALPHA *( ALPHA / DIGIT / "+" / "−" / "." )
// scheme name for which the app has registered with the BREW
app-data = [app-command-list]
// the app-data may be empty if the device application does not require any
commands/arguments at staff-up
app-command-list = "?" command-data *(";" command-data)
// An app-command-list specifies a list of commands to be executed in left-to-right
sequence order by the device application
command-data = "?" [command] [";" attributes-list]
// a set of attributes may be passed to the device application without specifying any
command if the app supports a default command mode
command = *( uchar / "/" / ":" / "@" / "!" / "$" / "&" / "'" / "(" / ")" / "*" / "+" /
";")
// device app specific command
attributes-list = attr-value-pair *("," attr-value-pair)
attr-value-pair = attribute "=" value
attribute = *( uchar / "/" / ":" / "@" / "!" / "$" / "&" / "'" / "(" / ")" / "*" / "+" / ";")
// attribute specific to the app command
value = *( uchar / "/" / ":" / "@" / "!" / "$" / "&" / "'" / "(" / ")" / "*" / "+" / ";")
uchar = unreserved / pct-encoded
unreserved = ALPHA / DIGIT / "−" / "." / "_" / "~"
pct-encoded = "%" HEXDIG HEXDIG
```

In the ABNF of Table 1, the term "app" is an abbreviation for the "application" or "client application"; the term "attr" is an abbreviation for "attribute," which at least partially defines a specified point within a target client application; the term "value" relates to a value to be used in combination with the attribute according to the command; the term "unchar" is an abbreviation for a percent encoded character based on an unreserved character; the term "unreserved" relates to a set of characters that are not reserved; and the term "pct-encoded" is an abbreviation for "percent-encoded," which refers to a mechanism for representing characters.

Figure 4:
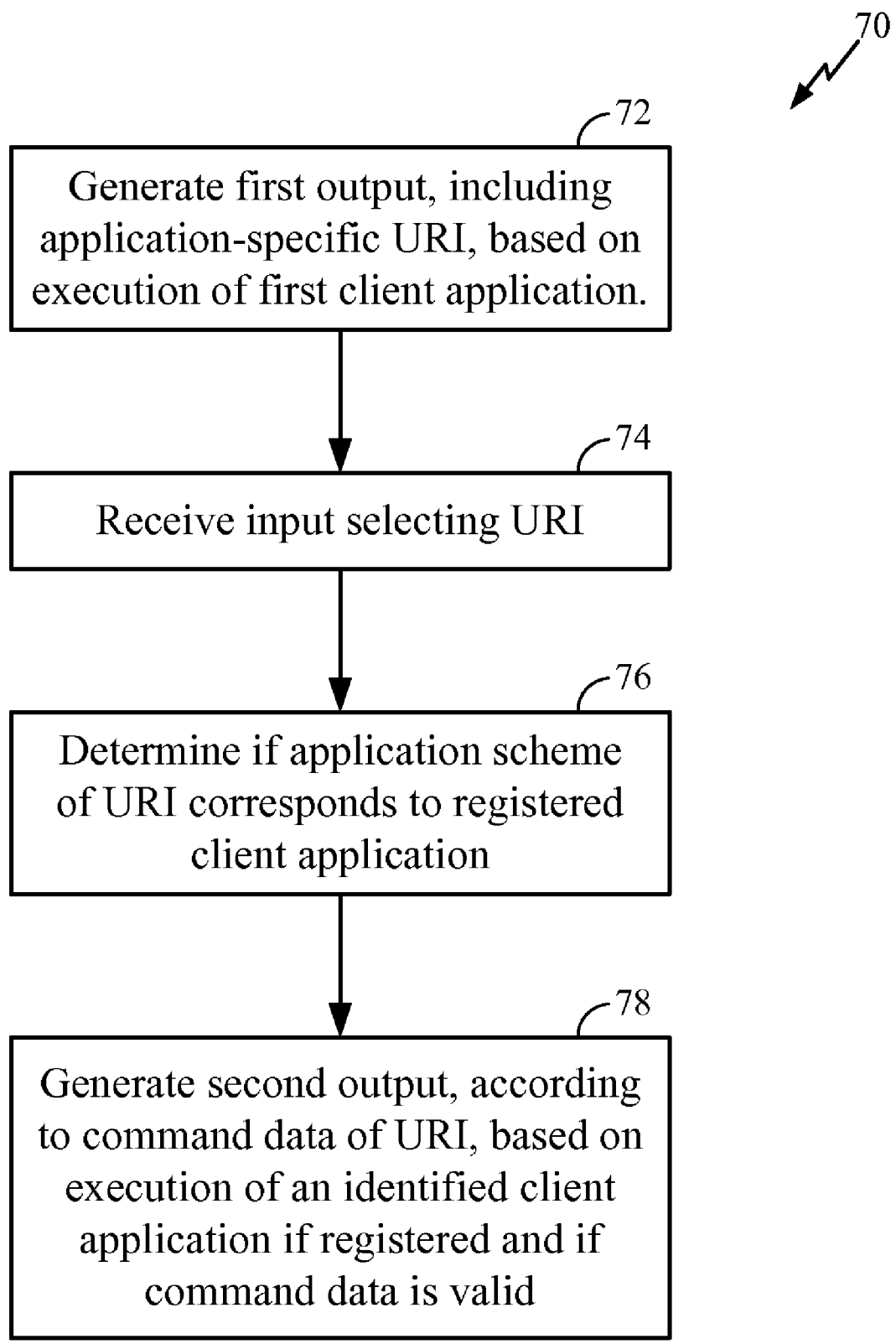
FIG. 4 is a flowchart of one aspect of a method of linking to an application on a wireless device.

In operation, referring to FIG. 4, one aspect of a method 70 of linking to an application on a wireless device includes generating a first output on a user interface of a wireless device based on execution of a first client application on the wireless device (Block 72). The first output includes an application-specific universal resource identifier having a predetermined syntax comprising an application scheme identifier and command data. The application scheme identifier corresponds to a target client application, and the command data represents at least one command for execution by the target client application. Further, in one aspect, the method includes receiving an input selecting the application-specific universal resource identifier (Block 74). Additionally, in response to the received input, this aspect of the method determines if the application scheme identifier of the selected application-specific universal resource identifier corresponds to a client application registered with the wireless device (Block 76).

If the determination indicates that the identified client application is registered as corresponding to the selected application scheme identifier and if the command data is valid, then this aspect of the method includes generating a second output on the user interface based on an execution of an identified client application according to the command data, where the second output corresponds to a predetermined point in the identified client application (Block 78).

Figure 5:
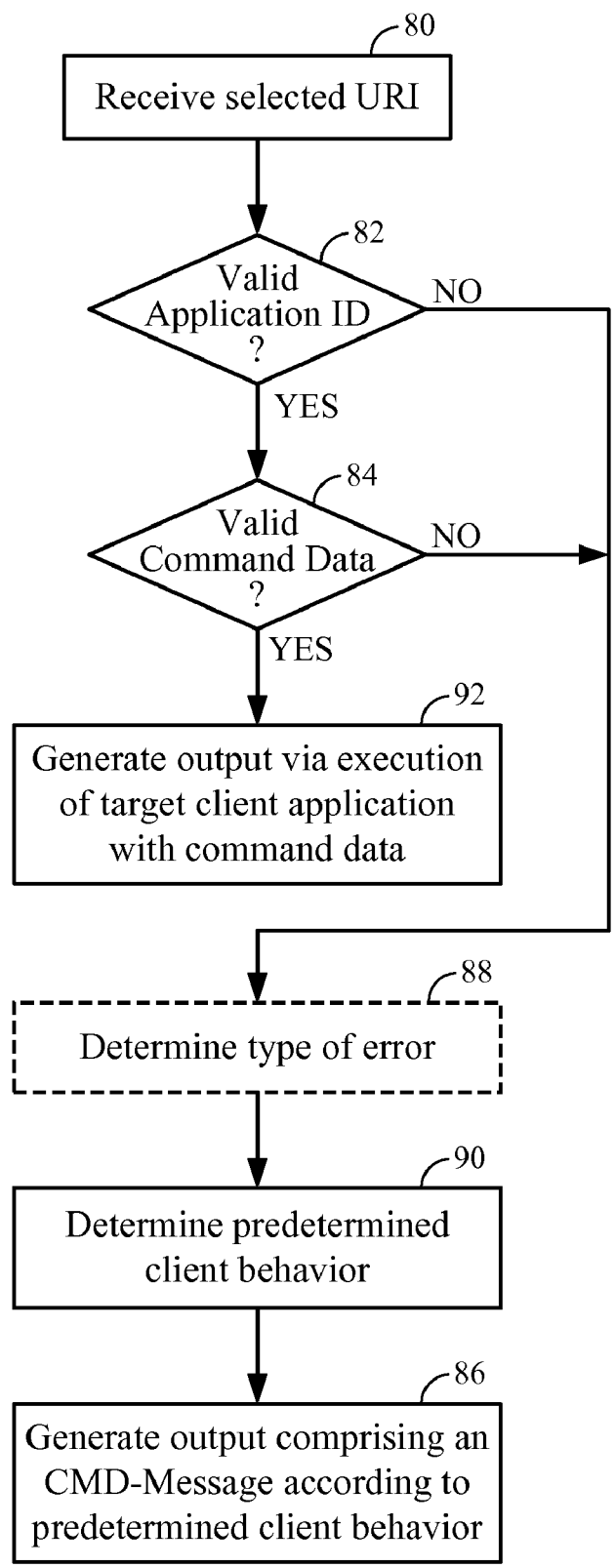
FIG. 5 is a flowchart of a further aspect of a method of linking to an application on a wireless device.

Referring to FIG. 5, in another aspect, which may be combined with the above method, the selected application-specific URI is received (Block 80) and a determination is made as to the validity of the application scheme identifier (Block 82). In particular, the determination compares the respective application scheme identifier with identifiers registered by client applications on a wireless device. If a match is found, then validity is confirmed and a determination is made as to the validity of the command data (Block 84). On the other hand, if a match is not found, then an error message is generated (Block 86). In some aspects, prior to generating the error message, a type of error corresponding to the application scheme identifier may be determined (Block 88), where different types of errors may result in the generation of different error messages. Also, in some aspects, prior to generating the error message, a predetermined client behavior corresponding to the application scheme identifier, or the determined type of error, or both, may be determined (Block 90), where different predetermined client behaviors may result in the generation of different error messages.

Returning to the validity determination of the command data (Block 84), if the result is valid command data, then the method generates an output via execution of the target client application with the command data (Block 92). As such, a selected application-specific URI can be defined and processed to link to a predetermined point or state of a target client application. On the other hand, if the command data is found to be invalid, then an error message is generated (Block 86). The error message may be a generic error message, or it may include information to differentiate the error message over the error message caused by an invalid scheme identifier. For example, the error message may define which portion of the application-specific URI caused the error. Further, similar to the processing of an invalid application scheme identifier, the error message resulting from invalid command data may further vary depending on a determined type of error (Block 88), or depending on a determined client behavior (Block 90), or both.

Figure 6:
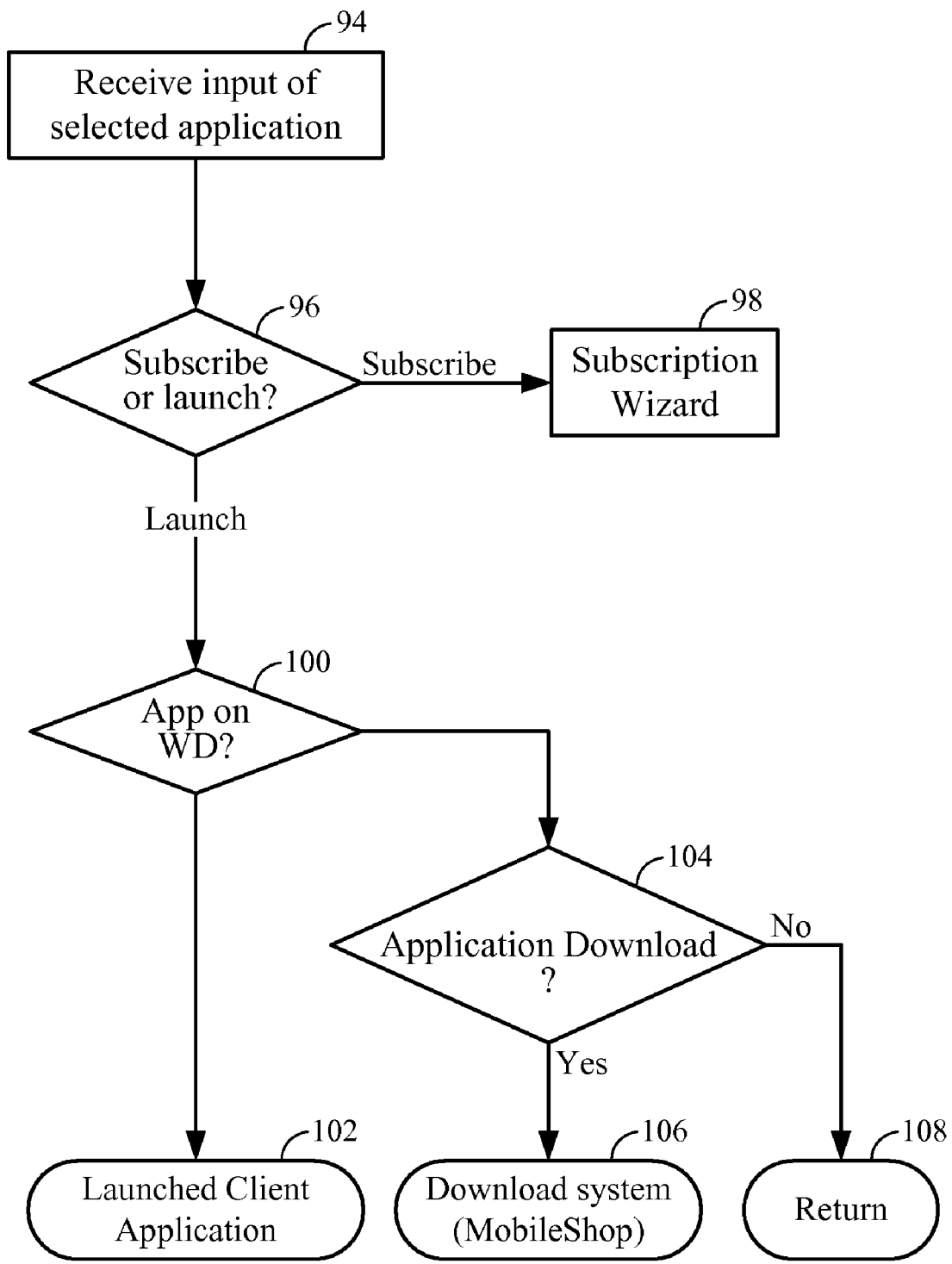
FIG. 6 is a flowchart of another aspect of a method of linking to an application on a wireless device.

Referring to FIG. 6, in another aspect of a method operable with a client application requiring a subscription, which may be combinable with any of the above methods, after receiving an input representing a selected application-specific URI (Block 94), a determination is made as to whether or not the wireless device is subscribed to the target client application (Block 96). If not, then the method links to a subscription wizard (Block 98) to enable subscribing. In some aspects, such a linkage may occur only in response to a user input indicating a desire to subscribe, while in other aspects the linkage may occur automatically. If the wireless device is subscribed, then the method includes a determination as to whether the target client application is resident in a memory on the wireless device (WD) (Block 100). If so, then the target client application is launched according to the command data to the predetermined point or state (Block 102). If the target client application is not on the wireless device, then the method determines if an application download is desired (Block 104). For example, the method may involve presenting a user with an interactive display requesting a user input to choose whether or not to download the application. If a download is desired, then the method connects the wireless device to an application download system (Block 106). For example, the wireless device may communicate over a wireless communication network to access an application download server, such as the MobileShop system available from QUALCOMM Incorporated of San Diego, Calif. If an application download is not desired, then the method may return to the first client application from which the application-specific URI was invoked (Block 108).

A specific example of a system of the described apparatus and methods described herein includes, but is not limited to, a media distribution system including content containing available to a wireless device, where the content includes an application-specific URI.

Figure 7:
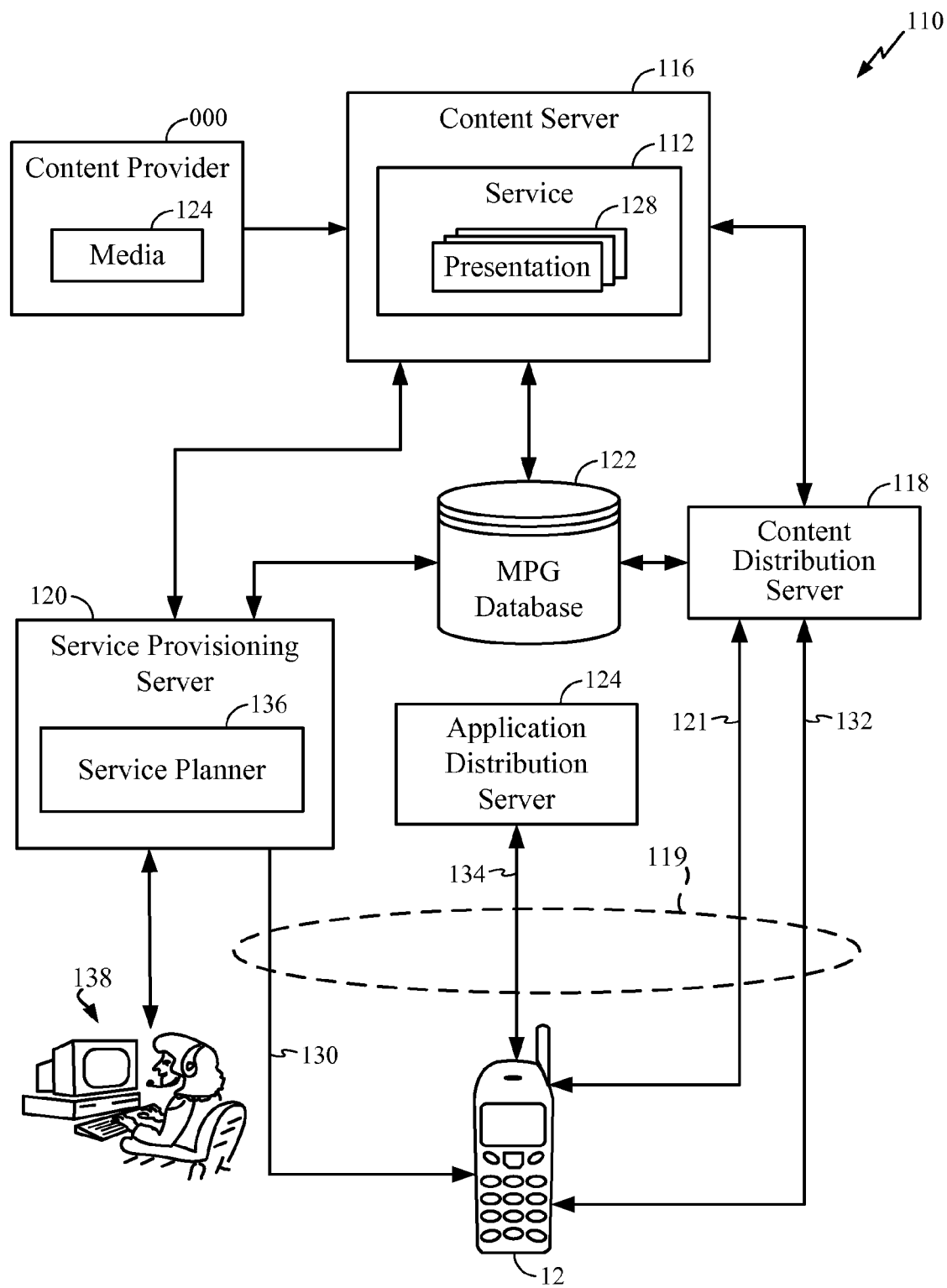
FIG. 7 is a schematic diagram of one aspect of a networked system for linking to an application on a wireless device.

In such aspect, referring to FIG. 7, a Media Distribution System ("MDS") 110 for downloading a service 112 to at least one wireless device 12 comprises a content provider 114, a content server 116, a content distribution server 118, a service provisioning server 120, a database 122, and an application distribution server 124. Such an MDS 110 may include, but is not limited to, the MediaFLO™ system available from QUALCOMM Incorporated of San Diego, Calif.

The content provider 114 operates to provide the content for distribution to users in the network 119 through content server 116 and content distribution server 118. In some aspects, for example, the content includes, but is not limited to, media 126, such as video, audio, multimedia content, clips, scripts, programs, data and any other suitable content. Media 126 may comprise real-time content, non real time content, and/or a combination of the two. Media 126, either individually or in combination, may form a presentation 128 that may be viewed or otherwise output on a device.

The content server 116 operates to provide the content distribution server 124 with presentations 128 associated with service 112. Service 112 comprises a sequence of presentations 128 offered under a single label, or identifier. Each presentation 128 may comprise real time content, non-real time content, and mixed combinations of real and non-real time content. Furthermore, each service 112 may provide real time presentations, non-real time presentations, and both real-time and non-real time presentations. For example, a real time presentation may be a live broadcast of a sporting event. Further, for example, a non real time presentation may be an advertisement. Additionally, a combined presentation may include, for example, links to player information in combination with a live broadcast of a sporting event.

Database 122 may comprise records that define a Media Presentation Guide (MPG) providing a broadcast schedule, or a time at which device 12 may present presentations 128 to a user and a time at which device 12 may retrieve non-real time content. In one non-limiting aspect, the MPG may be transmitted via a system information message 121 to a device 12 at the time of service activation, although it may be broadcast or otherwise transmitted at any time. Although database 122 is described as a data repository, it should be noted that any interface could be used that provides the media presentation guide information to the other components of system 110.

Device-server interfaces 130, 132, and 134 are operable to interface the device 12 with MDS 110 server components. Interfaces 130, 132, and 134 may be a physical connection and/or a wireless connection using air interface techniques such as any one or any combination of code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network. Interface 130 provides service activation and subscription information from service provisioning server 120; interface 132 provides MPG and content delivery from the content distribution server 118; and interface 134 provides application download capability between the device 12 and the application distribution server 124.

Additionally, it should be noted that the above-noted servers which define a portion of media distribution system 110 may be combined into a single server, and/or may each be a combinations of one or more servers. Further, these servers may be located together and/or remotely from one another. Additionally, the above-noted servers may communicate via a physical connection and/or via a wireless connection using the previously discussed air interface techniques.

In system 110, the service provisioning server 120 may include a service planner module 136, operable by a service manager 138 for planning service 112. As such, the planned service is communicated to content server 116 and database 122 to coordinate the distribution to wireless device 12. Correspondingly, the planned service defines the MPG, which can be updated with the system information message. In system 110, the MPG is displayable on wireless device via execution of a media client application, such as a MediaFLO client application. The MPG is one example of a predetermined point of state of an application that may be linked to via operation of application-specific URI. In another example, the MPG further defines an output that may include an application-specific URI to link to another point or state of an application, such as the MediaFLO application or some other client application.

The MediaFLO system will now be used to further describe one non-limiting example of the present apparatus and methods.

The MediaFLO system defines Universal Resource Identifiers (URIs) to enhance user interactivity related to a MediaFLO client and other device applications which can invoke the MediaFLO client or can be invoked from the MediaFLO client. This enhances user interactivity by allowing a user to link between the MediaFLO client and other device applications.

The design of the MediaFLO URI scheme is used to define URI links to the MediaFLO client. The MediaFLO client can be launched to a particular screen (e.g. MPG or Subscription Menu) using a specific MediaFLO URI.

To support linking to other device applications from the MediaFLO client, the MediaFLO URI scheme is generalized to specify generic device application URI syntax. The generic device application URI Syntax can be used as a template to define application specific URI schemes for launching any device application from the MediaFLO client.

A URI scheme is designed to specify links to the MediaFLO client application. The MediaFLO URI can be used to launch the MediaFLO client at a specific screen from any client application, such as a third party application. The MediaFLO URI can also be used to take the user to a specific MediaFLO screen from within the MediaFLO client application. The MediaFLO URI scheme is based on the URI Generic Syntax as specified by the RFC 3986.

Table 2 specifies the Augmented Backus-Naur Form (ABNF) for the MediaFLO URI scheme.

TABLE 2

ABNF for MediaFLO scheme mediaflo-uri = mediaflo-scheme ":" app-data
mediaflo-scheme = "mediaflo"
app-data = [app-command-list]
app-command-list = "?" command-data *(";" command-data)
// An app-command-list specifies a list of commands to be executed
in left-to-right sequence order by the application
command-data = command [ "," attributes-list ]
command = "dspSubMenu" / "dspPkgDetail" / "dspMpg" /
"dspChnlSubset" / "dspPresList" / "play" / "subscribe" / "unsubscribe"
attributes-list = attr-value-pair *( "," attr-value-pair)
attr-value-pair = attribute "=" value
attribute = "pkgName" / "pkgId" / "chnlName" / "chnlId" / "playMode" /
"presTitle" / "genre" / "lang"
value = *( uchar / "/" / ":" / "@" / "!" / "$" / "&" / "'" /
"(" / ")" / "*" / "+" / ";")
uchar = unreserved / pct-encoded
unreserved = ALPHA / DIGIT / "-" / "." / "_" / "~"
pct-encoded = "%" HEXDIG HEXDIG The scheme name used for the MediaFLO URI scheme is "mediaflo." The MediaFLO client registers with the BREW layer for the "mediaflo" scheme. This results in the BREW layer forwarding all the URI invocations for the "mediaflo" scheme to the MediaFLO client application.

It should be noted that the MediaFLO URI scheme does not require use of a hier-part component specified as part of the URI Generic Syntax. This is because the scope of the MediaFLO URI is local to a wireless device and does not require specifying host name and/or port. The MediaFLO URI scheme makes use of the query component in the URI Generic Syntax to specify MediaFLO application specific URI data. The query component starts with a "?" delimiter character.

As part of the query component, the MediaFLO URI scheme specifies a list of commands and associated arguments which can be passed to the MediaFLO client.

The RFC 3986 defines set of reserved characters which may be used as delimiters in URI schemes. Each individual URI scheme uses a subset of reserved characters as delimiters. The MediaFLO URI scheme uses the subset of the reserved characters specified by the following Equation (1) as delimiters.

$$\text{mediaflo-delims} = \text{":"} / \text{"?"} / \text{","} / \text{"/"} / \text{";"}\qquad\text{Equation (1)}$$

Reserved characters other than the ones specified by Equation (1) can be used as part of the URI data in the MediaFLO URI scheme in non-percent-encoded form.

The command component in the MediaFLO URI scheme specifies a MediaFLO application specific command. Table 3 lists some examples of defined MediaFLO URI commands.

TABLE 3

MediaFLO URI Commands

| Command | Description |
|---|---|
| dspSubMenu | Display the subscription menu view in the MediaFLO client |
| dspPkgDetail | Display details for a particular package in the MediaFLO client |
| dspMpg | Display the media programming guide (mpg) view in the MediaFLO client |
| dspChnlSubset | Display a subset of channels belonging to a particular category e.g. based on a particular 'genre' in the MediaFLO client |
| dspPresList | Display the list of presentation for a multi-view presentation channel in the MediaFLO client |
| play | Play a particular channel in the MediaFLO client |
| subscribe | Take user to the subscription point for a particular package |
| unsubscribe | Take user to the un-subscription point for a particular premium package |

The attribute component in the MediaFLO URI scheme specifies an attribute specific to a particular associated command. One or more attributes can be specified for a command in the MediaFLO URI. Table 4 lists some examples of defined MediaFLO URI attributes.

TABLE 4

MediaFLO URI attributes

| Command | Description | Allowed Values |
|---|---|---|
| pkgName | Specifies the name of a MediaFLO package | |
| pkgId | Specifies the identifier for a MediaFLO package | |
| chnlName | Specifies the name of a MediaFLO channel | The channel call letter is used as the channel name. |
| chnlId | Specifies the identifier for a MediaFLO channel | |
| playMode | Specifies a particular mode for the media player. | "full screen" "normal" |
| presTitle | Specifies the presentation title for the presentation to be played for a multi-presentation view channel | |
| presId | Specifies the presentation Id for the presentation to be played for a multi-presentation view channel | |
| genre | Specifies the genre for a MediaFLO channel | Per MPEG-7 standard |
| lang | Specifies the locale used to represent character string | Per ISO 639-2 and ISO 3166 standards |

Further, the MediaFLO URI scheme is generic to allow various combinations of commands and attributes as well as combinations of multiple commands. In at least one non-limiting aspect, a subset of these combinations of commands and attributes may be valid for the MediaFLO client. MediaFLO URI generation rules are specified to ensure that only valid MediaFLO URIs are generated.

In particular, the MediaFLO URI generation rules specify a valid set of commands and associated mandatory and optional attributes for the MediaFLO URI scheme. The MediaFLO URI generation rules also specify a valid combination of commands that can be used in a MediaFLO URI. Table 5 lists some examples of MediaFLO URI generation rules.

TABLE 5

MediaFLO URI Generation Rules

| Command | Mandatory Attributes | Optional Attributes |
|---|---|---|
| dspSubMenu | | lang, pkgName or pkgId |
| dspPkgDetail | pkgName or pkgId | lang |
| dspMpg | | lang, chnlName or chnlId |
| dspChnlSubset | genre | lang |
| dspPresList | chnlName or chnlId | |
| play | chnlName or chnlId | playMode, lang, presTitle or presId |
| subscribe | pkgName or pkgId | lang |
| unsubscribe | pkgName or pkgId | lang |

The following are examples of MediaFLO client application-specific URIs:

mediaflo:?play,chnlNm=ESPN
// clicking on this URI will start the MediaFLO application at the media player view, playing ESPN channel.
mediaflo:?dspSubMenu,pkgName=sports
// clicking on this URI will start the MediaFLO application at the subscription menu highlighting the "sports" package
mediaflo:?play,chnlName=ESPN,presTitle=Tennis-highlights
// clicking on this URI will start the MediaFLO application and play the presentation titled "Tennis-highlights" on the ESPN channel.
mediaflo:?dspPresList,chnlName=MTV
// clicking on this URI will start the MediaFLO application and display the list of presentations for the MTV channel In one aspect, the MediaFLO URI is encoded using the US-ASCII encoding. The mediaflo delimiter characters occurring as part of the URI data octets may be percent-encoded in the MediaFLO URI scheme. If the MediaFLO URI contains textual data that contains characters from the Universal Character Set (UCS), the data may first be encoded as octets using the UTF-8 encoding. Then, the octets that do not correspond to characters in the unreserved set may be percent-encoded.

Further, in one example, BREW has no limitation on the maximum length for the URI which can be passed to a device application. The MediaFLO UI application may have a pre-determined maximum length. For example, in one use case, a hard coded limit of 8 k bytes is set for the maximum MediaFLO URI length.

In operation, the MediaFLO client parses the received URI and executes the commands in the URI in a left-to-right sequence order. In some aspects, the MediaFLO client may first decode the URI before performing any string comparisons as part of executing the command. The string comparisons may be done in a case insensitive manner.

A MediaFLO URI received by the MediaFLO client fails if the URI is not well-formed or if the attribute values specified for the command are not valid. The MediaFLO client behavior can be specified for different failure scenarios. This following list includes examples of URI failure scenarios and associated MediaFLO client behavior. It should be noted that additional failures and behaviors may be defined depending on the given implementation. For each failure scenario, examples of MediaFLO URIs are listed. The failure scenario also specifies context specific UI display messages, but purely for illustration purposes.

Failure Scenario 1

The MediaFLO client receives a MediaFLO URI containing a dspSubMenu or a dspPkgDetail command with a single associated pkgName/pkgId attribute.

Example URIs

```
mediaflo:?dspSubMenu,pkgName=sports
mediaflo:?dspSubMenu,pkgId=10
mediaflo:?dspPkgDetail,pkgName=sports
mediaflo:?dspPkgDetail,pkgId=10
```

MediaFLO Client Behavior

If package specified by the pkgName/pkgId is not found on the client, the MediaFLO client displays an error message "MediaFLO package <pkg name> not found" and then takes the user to the subscription menu.

The MediaFLO client can include the package name as part of the error message if the package name attribute is specified.

Failure Scenario 2

The MediaFLO client receives a MediaFLO URI containing a containing a dspSubMenu or a dspPkgDetail command with more than one associated pkgName/pkgId attributes.

Example URIs

```
mediaflo:?dspSubMenu,pkgName=sports,pkgId=20
mediaflo:?dspPkgDetaile,pkgId=30,pkgName=sports
```

MediaFLO Client Behavior

The MediaFLO client can honor the first package attribute specified (either pkgNeme or pkgId).

If the package specified by the first pkgName/pkgId attribute is not found, the MediaFLO client can display an error message "MediaFLO package <pkg name> not found" and then take the user to the subscription menu.

Failure Scenario 3

The MediaFLO client receives a MediaFLO URI containing a subscribe command with a single associated pkgName/pkgId attribute or multiple associated pkgName/pkgId attributes.

Example URIs

```
mediaflo:?subscribe,pkgName=sports
mediaflo:?subscribe,pkgId=20
mediaflo:?subscribe,pkgId=30,pkgName=sports
```

MediaFLO Client Behavior

If user is already subscribed to the package specified by pkgName/pkgId, the MediaFLO Client can display message "Already Subscribed to MediaFLO <pkg name> package" and take user to user's default screen.

If package specified by the pkgName/pkgId is not found or not subscribable (due to package hierarchy or un-supported device profile), the MediaFLO client can display message "Subscription failed to MediaFLO <pkg name> package" and then take the user to the subscription menu.

Failure Scenario 4

The MediaFLO client receives a MediaFLO URI containing a unsubscribe command with a single associated pkgName/pkgId attribute or multiple associated pkgName/pkgId attributes.

Example URIs

```
mediaflo:?unsubscribe,pkgName=sports
mediaflo:?unsubscribe,pkgId=20
mediaflo:?unsubscribe,pkgId=30,pkgName=sports
```

MediaFLO Client Behavior

The unsubscription from an external source may only be allowed for the premium packages. If the package specified by the pkgName/pkgId is a base package, the MediaFLO client can display message "Unsubscription to <pkg name> base package not allowed" and take user to the user's default screen.

If user is not subscribed to package specified by the pkgName/pkgId, the MediaFLO client can display message "Not Subscribed to MediaFLO <pkg name> package" and take user to the user's default screen.

Failure Scenario 5

The MediaFLO client receives a MediaFLO URI containing a dspMpg command with a single associated chnlName/chnlId attribute or multiple associated chnlName/chnlId attributes.

Example URIs

```
mediaflo:?dspMpg,chnlName=CNBC
mediaflo:?dspMpg,chnlId=5
mediaflo:?dspMpg,chnlName=CNBC,chnlId=5
```

MediaFLO Client Behavior

The MediaFLO client can honor the first channel attribute specified (either chnlName or chnlId) for the case when multiple channel attributes are included.

If user is not subscribed to channel specified by the chnlName/chnlId, the MediaFLO client can display message "Not subscribed to MediaFLO <channel name> channel" and take the user to the package detail view in the subscription menu for the package which contains the channel.

If channel specified by the chnlName/chnlId is not found, the MediaFLO client can display message "MediaFLO <channel name> channel not found" and then take the user to the MPG view.

If the channel specified by the chnlName/chnlId is excluded, the MediaFLO client may display message "MediaFLO <channel name> channel is excluded" and then take the user to the MPG view.

The MediaFLO client can include the channel name as part of the error message if the channel name attribute is specified.

Failure Scenario 6

The MediaFLO client receives a MediaFLO URI containing a dspPresList command with a single associated chnlName/chnlId attribute or multiple associated chnlName/chnlId attributes.

Example URIs

```
mediaflo:?dspPresList,chnlName=ABC
mediaflo:?dspPresList,chnlId=5
mediaflo:?dspPresList,chnlName=ABC,chnlId=5
```

MediaFLO Client Behavior

If user not subscribed to channel specified by the chnlName/chnlId, the MediaFLO client can display message: "Not subscribed to MediaFLO <channel name> channel" and then take the user to the package detail view in the subscription menu for the package which contains the channel.

If channel specified by the chnlName/chnlId is not found, the MediaFLO client may display message: "MediaFLO channel <channel name> not found" and then take the user to the user's default screen.

If the channel specified by the chnlName/chnlId is not a Multi-Presentation View channel, the MediaFLO client can take the user to the MPG view and highlight the channel.

If the channel specified by the chnlName/chnlId is excluded, the MediaFLO client can display message "MediaFLO <channel name> channel is excluded" and then take the user to the user's default screen.

Failure Scenario 7

The MediaFLO client receives a MediaFLO URI containing a play command with a single associated chnlName/chnlId attribute or multiple associated chnlName/chnlId attributes.

Example URIs

---
mediaflo:?play,chnlName=ABC
mediaflo:?play,chnlId=5
mediaflo:?play,chnlName=ABC,chnlId=5
---

MediaFLO Client Behavior

If user is not subscribed to channel specified by the chnlName/chnlId, the MediaFLO client may display message "Not Subscribed to MediaFLO <channel name> channel" and then take the user to the package detail view in the subscription menu for the package which contains the channel.

If channel specified by the chnlName/chnlId is not found, the MediaFLO client can display message "MediaFLO <channel name> channel not found" and then take the user to the user's default screen.

If the channel specified by the chnlName/chnlId is an MPV channel, the client can play the first presentation in the presentation list.

If the channel is a clipcast, datacast, or MPV channel and no presentation is available, the MediaFLO client may display message "No presentation available for the MediaFLO <channel name> channel" and then take the user to the user's default screen.

If the channel specified by the chnlName/chnlId is excluded, the MediaFLO client can display message "MediaFLO <channel name> channel is excluded" and then take the user to the user's default screen.

Failure Scenario 8

The MediaFLO client receives a MediaFLO URI containing a play command with a single associated chnlName/chnlId attribute or multiple associated chnlName/chnlId attributes and also one or more associated presTitle/presId attributes.

Example URIs

---
mediaflo:?play,chnlName=ESPN, presTitle=MLB-highlights
mediaflo:?play,chnlId=5,presTitle=MLB-highlights, presId=4
mediaflo:?play,chnlName=ESPN,chnlId=5,presTitle=MLB-highlights
mediaflo:?play,chnlName=ESPN,chnlId=5,presTitle=MLB-highlights,
                    presTitle=Tennis-highlights
---

MediaFLO Client Behavior

The MediaFLO client operates to honor the first presTitle/presId attribute specified for the case when multiple presTitle/presId attributes are included.

If user is not subscribed to channel specified by the chnlName/chnlId, the MediaFLO client can display message "Not Subscribed to MediaFLO <channel name> channel" and then take the user to the package detail view in the subscription menu for the package which contains the channel.

If channel specified by the chnlName/chnlId is not found, the MediaFLO client can display message "MediaFLO <channel name> channel not found" and then take the user to the user's default screen.

If the user is subscribed to the channel but the presentation specified by the presTitle is not found, the MediaFLO client can display message "MediaFLO presentation <presTitle> not found" and display the presentation list view for the channel.

The MediaFLO client can include the presentation title as part of the error message if the presentation title is specified.

If the channel specified by the chnlName is a real time, clipcast, or datacast channel, the MediaFLO client can ignore the presTitle/presId attribute and try to play the channel.

If the channel specified by the chnlName/chnlId is excluded, the MediaFLO client can display message "MediaFLO <channel name> channel is excluded" and then take the user to the user's default screen.

If there are multiple presentations for an MPV channel which have the same presentation title as specified by the presTitle attribute, the MediaFLO client can play the first presentation in the list matching the presTitle.

Failure Scenario 9

If the MediaFLO URI is badly formed and it can be determined that it is a subscription related URI, the MediaFLO client may display message "Badly formed MediaFLO URI" and take the user to the Subscription menu view.

If the MediaFLO URI is badly formed and is not a subscription related URI or the type of the URI cannot be determined, the MediaFLO client can display message "Badly formed MediaFLO URI" and then take the user to the user's default screen.

If a channel specified by a chnlName/chnlId attribute in the MediaFLO URI is included in multiple packages, the MediaFLO client can provide a package list to the user for the packages which include the channel.

If a package specified by a pkgName attribute in the MediaFLO URI cannot be resolved to a single package, the MediaFLO client can provide a package list to the user for the packages which match the pkgName.

To support linking to other device applications from the MediaFLO client, the MediaFLO URI scheme is generalized to specify a generic device or client application-specific URI syntax. The generic device or client application-specific URI syntax provides a template for use by device or client applications to specify URI links to launch these applications. A device or client application can use the generic device or client application-specific URI template to define an application-specific URI scheme (similar to the MediaFLO scheme). Table 1, discussed previously, specifies the generic device application URI syntax.

A device application using the generic device or client application-specific URI template to define an application specific URI scheme may define the following:

Application Scheme:
List of allowed commands for the application
List of allowed attributes for commands URI generation rules (permissible combination of commands and attributes)

The device or client application may register with the BREW layer for an application scheme. In order to insure that the app-scheme it used does not collide with any other device or client application, the device or client application may include the corresponding application class identifier, for example in hexadecimal format, as part of the scheme, e.g. for an Internet Protocol data application, the application scheme identifier may be: ipdata.<class_id>.

Thus, the described apparatus and methods define a predetermined scheme or syntax for an application-specific URI operable to deep link to a specified point, portion, or view of a target client application. Accordingly, in an aspect, a uniform resource identifier (URI) comprises a scheme name portion that corresponds to a target client application. Further, the URI includes a colon appended to the scheme name portion, and a question mark (?) following the colon. Additionally, the URI includes an application linkage portion following the question mark, wherein the application linkage portion corresponds to a predetermined point in the target client application corresponding to the scheme name portion. In another aspect, a method of generating a uniform resource identifier (URI) comprises generating text indicating a scheme name portion that corresponds to a target client application. Further, the method includes appending a colon to the text indicating the scheme name portion, and generating a question mark (?) followed by an application linkage portion after the colon. The application linkage portion corresponds to a predetermined point in the target client application corresponding to the scheme name portion.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementations may be utilized with all or a portion of any other aspect and/or implementations, unless stated otherwise.

What is claimed is:

1. A method of linking to an application on a wireless device, comprising:
generating a first output on a user interface of a wireless device based on execution of a first client application on the wireless device, wherein the first output comprises an application-specific universal resource identifier having a predetermined syntax comprising an application scheme identifier and command data, wherein the application scheme identifier corresponds to a target client application, and wherein the command data represents at least one command for execution by the target client application;
receiving an input selecting the application-specific universal resource identifier;
determining if the application scheme identifier of the selected application-specific universal resource identifier corresponds to a client application registered with the wireless device; and
generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

2. The method of claim 1, wherein generating the second output further comprises executing the identified client application on the wireless device to generate a first predetermined one of a plurality of identified client application outputs.

3. The method of claim 2, wherein generating the first output further comprises executing the first client application on the wireless device to generate a predetermined one of a plurality of first client application outputs.

4. The method of claim 2, wherein generating the first output further comprises generating a second predetermined one of the plurality of identified client application outputs, wherein the second predetermined one of the plurality of identified client application outputs is different from the first predetermined one of the plurality of identified client application outputs.

5. The method of claim 1, wherein generating the first output further comprises rendering a first graphical user interface on a display of the wireless device, wherein the first graphical user interface comprises one of a plurality of first client application graphical user interfaces generatable by execution of the first client application on the wireless device, and wherein generating the second output further comprises generating a second graphical user interface on the display of the wireless device, wherein the second graphical user interface comprises one of a plurality of identified client application graphical user interfaces generatable by execution of the identified client application on the wireless device.

6. The method of claim 1, wherein the determining further comprises selecting, based on the selected application scheme identifier, the identified client application from a plurality of client applications operable to be resident in a memory of the wireless device, wherein each of the plurality of client applications is registered with a runtime environment executing on the wireless device as corresponding to one of a plurality of application scheme identifiers.

7. The method of claim 1, further comprising determining if the command data corresponds to at least one valid command data, and generating an error-based output according to a predetermined client behavior if the command data is not valid.

8. The method of claim 7, wherein the command data comprises at least one command and a corresponding at least one attribute, wherein determining if the command data corresponds to at least one valid command data further comprises at least one of identifying whether the at least one command corresponds to one of a plurality of valid commands, or identifying whether the at least one command corresponds to a valid combination of commands, or identifying whether the at least one command and the corresponding at least one attribute respectively correspond to one of a plurality of valid commands and one of a plurality of mandatory attributes or one of a plurality of optional attributes, or identifying whether the at least one command and the corresponding at least one attribute respectively correspond to a valid combination of commands and one of a plurality of mandatory attributes or one of a plurality of optional attributes.

9. The method of claim 7, wherein generating an error-based output according to a predetermined client behavior further comprises selecting one of a plurality of predetermined client behaviors corresponding to a determined error in the command data.

10. The method of claim 1, wherein generating the first output further comprises generating the application-specific universal resource identifier having the predetermined syntax further comprising an application class identifier corresponding to the target client application.

11. The method of claim 1, further comprising:
determining whether the wireless device is subscribed to the target client application;
if the wireless device is not subscribed to the target application, then generating a subscription menu for obtaining a subscription; or
if the wireless device is subscribed to the target client application, then determining if the target client application is resident on the wireless device;
if the target client application is resident on the wireless device, then launching the target client application; or
if the target client application is not resident on the wireless device, then either downloading the target client application to the wireless device or exiting back to the first client application.

12. The method of claim 1, wherein generating the first output further comprises generating the application-specific universal resource identifier according to an Augmented Backus-Naur form comprising:

```
app-uri = app-scheme ":" app-data
app-scheme = ALPHA *( ALPHA / DIGIT / "+" / "-" / "." )
app-data = [app-command-list]
app-command-list = "?" command-data *(";" command-data)
command-data = "?" [command] [";" attributes-list]
command = *( uchar / "/" / ":" / "@" / "!" / "$" / "&" / "'" /
"(" / ")" / "*" / "+" / ";" )
attributes-list = attr-value-pair *("," attr-value-pair)
attr-value-pair = attribute "=" value
attribute = *( uchar / "/" / ":" / "@" / "!" / "$" / "&" / "'" /
"(" / ")" / "*" / "+" / ";" )
```

-continued

```
value = *( uchar / "/" / ":" / "@" / "!" / "$" / "&" / "'" /
"(" / ")" / "*" / "+" / ";")
uchar = unreserved / pct-encoded
unreserved = ALPHA / DIGIT / "-" / "." / "_" / "~"
pct-encoded = "%" HEXDIG HEXDIG
``` wherein the app-scheme comprises a scheme name for the application scheme, wherein the app-data comprises an empty value if the target client device application does not require any commands at start-up,
wherein the app-command-list specifies a list of commands executed in a predetermined sequence by the target client application,
wherein only the attributes-value-pair are passed to the target client application without specifying any command if the target client application supports a default command mode,
wherein the command comprises a target client application-specific command, and
wherein the attribute is specific to the target client application-specific command.

13. The method of claim 12, wherein generating the application-specific universal resource identifier according to an Augmented Backus-Naur form further comprises generating the command according to:

```
command = "dspSubMenu" / "dspPkgDetail" / "dspMpg" /
"dspChnlSubset" / "dspPresList" / "play" / "subscribe" / "unsubscribe"
``` wherein dspSubMenu comprises displaying a subscription menu view, wherein dspPkgDetail comprises displaying a particular media package, wherein dspMpg comprises displaying a media program guide view,
wherein dspChnlSubset comprises displaying a subset of channels belonging to a particular category,
wherein dspPresList comprises displaying a list of presentations for a multi-view presentation channel,
wherein play comprises playing a particular channel,
wherein subscribe comprises generating a subscription view for a particular package,
wherein unsubscribe comprises generating a subscription view for a particular package,
and further comprising generating the attribute according to:

```
attribute = "pkgName" / "pkgId" / "chnlName" / "chnlId" /
"playMode" / "presTitle" / "genre" / "lang"
``` wherein pkgName comprises a name of a media package,
wherein pkgId comprises an identifier of a media package,
wherein chnName comprises a name of a channel,
wherein chnlId comprises an identifier of a channel,
wherein playMode comprises a particular mode for a media player,
wherein presTitle comprises a presentation title for a presentation to be played, wherein genre comprises a genre corresponding to a channel, and
wherein lang comprises a locale used to represent a character string associated with the application-specific universal resource identifier.

14. At least one processor coupled to a non-transitory memory, the at least one processor configured to link to an application on a wireless device, comprising:
- a first module for generating a first output on a user interface of a wireless device based on execution of a first client application on the wireless device, wherein the first output comprises an application-specific universal resource identifier having a predetermined syntax comprising an application scheme identifier and command data, wherein the application scheme identifier corresponds to a target client application, and wherein the command data represents at least one command for execution by the target client application;
- a second module for receiving an input selecting the application-specific universal resource identifier;
- a third module for determining if the application scheme identifier of the selected application-specific universal resource identifier corresponds to a client application registered with the wireless device; and
- a fourth module for generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

15. A computer program product configured to link to an application on a wireless device, comprising:
- a non-transitory computer-readable medium comprising:
- at least one instruction for causing a computer to generate a first output on a user interface of a wireless device based on execution of a first client application on the wireless device, wherein the first output comprises an application-specific universal resource identifier having a predetermined syntax comprising an application scheme identifier and command data, wherein, the application scheme identifier corresponds to a target client application, and wherein the command data represents at least one command for execution by the target client application;
- at least one instruction for causing the computer to receive an input selecting the application-specific universal resource identifier;
- at least one instruction for causing the computer to determine if the application scheme identifier of the selected application-specific universal resource identifier corresponds to a client application registered with the wireless device; and
- at least one instruction for causing the computer to generate a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

16. An apparatus configured to link to an application on a wireless device, comprising:
- means for generating a first output on a user interface of a wireless device based on execution of a first client application on the wireless device, wherein the first output comprises an application-specific universal resource identifier having a predetermined syntax comprising an application scheme identifier and command data, wherein the application scheme identifier corresponds to a target client application, and wherein the command data represents at least one command for execution by the target client application;
- means for receiving an input selecting the application-specific universal resource identifier;
- means for determining if the application scheme identifier of the selected application-specific universal resource identifier corresponds to a client application registered with the wireless device; and
- means for generating a second output on the user interface based on an execution of an identified client application according to the command data if the determination indicates that the identified client application is registered as corresponding to the selected application scheme identifier and if the command data is valid, wherein the second output corresponds to a predetermined point in the identified client application.

17. A wireless device, comprising:
- a user interface;
- a memory comprising at least a first client application, a registry and a list representing valid command data, wherein the registry identifies at least one application scheme identifier corresponding to at least one client application;
- a processor in communication with the user interface and the memory, wherein the processor is operable to execute the first client application to generate a first output on the user interface, wherein the first output comprises an application-specific universal resource identifier having a predetermined syntax comprising an application scheme identifier and command data, wherein the application scheme identifier corresponds to a target client application, and wherein the command data represents at least one command for execution by the target client application,
- wherein the user interface is further operable to receive an input selecting the application-specific universal resource identifier,
- wherein the processor is further operable to determine if the application scheme identifier of the selected application-specific universal resource identifier corresponds to any client application in the registry,
- wherein the processor is further operable to determine if the command data is valid if the application scheme identifier of the selected application-specific universal resource identifier corresponds to any client application in the registry, and
- wherein the processor is further operable to execute an identified client application according to the command data to generate a second output on the user interface if the identified client application corresponds to the selected application scheme identifier in the registry and if the command data is valid, wherein the second output corresponds to a predetermined point in the identified client application.

18. The wireless device of claim 17, wherein the second output further comprises a first predetermined one of a plurality of identified client application outputs.

19. The wireless device of claim 18, wherein the first output further comprises a predetermined one of a plurality of first client application outputs.

20. The wireless device of claim 18, wherein the first output further comprises a second predetermined one of the plurality of identified client application outputs, wherein the second predetermined one of the plurality of identified client application outputs is different from the first predetermined one of the plurality of identified client application outputs.

21. The wireless device of claim 17, wherein the user interface further comprises a display, wherein the first output further comprises a first graphical user interface rendered on the display, wherein the first graphical user interface comprises one of a plurality of first client application graphical user interfaces generatable by execution of the first client application on the wireless device, and wherein the second output further comprises a second graphical user interface rendered on the display, wherein the second graphical user interface comprises one of a plurality of identified client application graphical user interfaces generatable by execution of the identified client application on the wireless device.

22. The wireless device of claim 17, further comprising a runtime environment executable by the processor, wherein the registry further comprises a plurality of application scheme identifiers corresponding to a plurality of client applications, wherein the runtime environment is operable to select, based on the selected application scheme identifier, the identified client application from the plurality of client applications in the registry.

23. The wireless device of claim 17, wherein the memory further comprises at least one error-based output corresponding to at least one invalid command data, wherein the at least one error-based output comprises a predetermined client behavior, and wherein the processor is further operable to generate the at least one error-based output on the user interface if the command data comprises the at least one invalid command data.

24. The wireless device of claim 17, wherein the command data comprises at least one command and a corresponding at least one attribute, wherein the at least one invalid command data further is determined based on at least one of: the at least one command corresponding to one of a plurality of valid or invalid commands, or the at least one command corresponding to a valid or invalid combination of commands, or the at least one command corresponding to one of a plurality of valid or invalid commands and the corresponding at least one attribute corresponding to or not corresponding to at least one of a plurality of mandatory attributes or one of a plurality of optional attributes, or the at least one command corresponding to a valid or invalid combination of commands and the at least one attribute corresponding to or not corresponding to at least one of a plurality of mandatory attributes.

25. The wireless device of claim 23, wherein the processor is operable to generate the at least one error-based output from a plurality of predetermined client behaviors according to a determined error in the command data.

26. The wireless device of claim 17, wherein the predetermined syntax further comprises an application class identifier corresponding to the target client application.

27. The wireless device of claim 17, wherein the processor is further operable to determine whether the wireless device is subscribed to the target client application;
if the wireless device is not subscribed to the target application, then the processor being further operable to generate a subscription menu for obtaining a subscription; or
if the wireless device is subscribed to the target client application, then
the processor further operable to determine if the target client application is resident on the wireless device;
if the target client application is resident on the wireless device, then the processor further operable to launch the target client application; or
if the target client application is not resident on the wireless device, then the processor further operable to either download the target client application to the wireless device or exit back to the first client application.

28. The wireless device of claim 17, wherein the application-specific universal resource identifier comprises an Augmented Backus-Naur form comprising:

```
app-uri = app-scheme ":" app-data
app-scheme = ALPHA *( ALPHA / DIGIT / "+" / "-" / "." )
app-data = [app-command-list]
app-command-list = "?" command-data *(";" command-data)
command-data = "?" [command] [";" attributes-list]
command = *( uchar / "/" / ":" / "@" / "!" / "$" / "&" / "'" /
    "(" / ")" / "*" / "+" / ";" )
attributes-list = attr-value-pair *("," attr-value-pair)
attr-value-pair = attribute "=" value
attribute = *( uchar / "/" / ":" / "@" / "!" / "$" / "&" / "'" /
    "(" / ")" / "*" / "+" / ";" )
value = *( uchar / "/" / ":" / "@" / "!" / "$" / "&" / "'" /
    "(" / ")" / "*" / "+" / ";")
uchar = unreserved / pct-encoded
unreserved = ALPHA / DIGIT / "-" / "." / "_" / "~"
pct-encoded = "%" HEXDIG HEXDIG
``` wherein the app-scheme comprises a scheme name for the application scheme, wherein the app-data comprises an empty value if the target client device application does not require any commands at start-up,
wherein the app-command-list specifies a list of commands executed in a predetermined sequence by the target client application,
wherein only the attributes-value-pair are passed to the target client application without specifying any command if the target client application supports a default command mode,
wherein the command comprises a target client application-specific command, and
wherein the attribute is specific to the target client application-specific command.

29. The wireless device of claim 28, wherein generating the Augmented Backus-Naur form further comprises:

```
command = "dspSubMenu" / "dspPkgDetail" / "dspMpg" /
"dspChnlSubset" / "dspPresList" / "play" / "subscribe" / "unsubscribe"
``` wherein dspSubMenu comprises displaying a subscription menu view, wherein dspPkgDetail comprises displaying a particular media package, wherein dspMpg comprises displaying a media program guide view,
wherein dspChnlSubset comprises displaying a subset of channels belonging to a particular category,
wherein dspPresList comprises displaying a list of presentations for a multi-view presentation channel,
wherein play comprises playing a particular channel,
wherein subscribe comprises generating a subscription view for a particular package,
wherein unsubscribe comprises generating a subscription view for a particular package,
and further comprises:

```
attribute = "pkgName" / "pkgId" / "chnlName" / "chnlId" /
"playMode" / "presTitle" / "genre" / "lang"
``` wherein pkgName comprises a name of a media package,
wherein pkgId comprises an identifier of a media package, wherein chnName comprises a name of a channel,
wherein chnlId comprises an identifier of a channel,
wherein playMode comprises a particular mode for a media player,
wherein presTitle comprises a presentation title for a presentation to be played, wherein genre comprises a genre corresponding to a channel, and
wherein lang comprises a locale used to represent a character string associated with the application-specific universal resource identifier.

30. A method of generating a uniform resource identifier (URI), comprising: generating text indicating a scheme name portion, wherein the scheme name portion corresponds to a target client application;
appending a colon (:) to the text indicating the scheme name portion; and
generating a question mark (?) followed by an application linkage portion after the colon, wherein the application linkage portion corresponds to a predetermined point in the target client application corresponding to the scheme name portion, wherein the question mark is placed immediately after the colon in the URI.

31. The method of claim 30, wherein generating the question mark (?) followed by an application linkage portion further comprises generating at least one of a command, or an attribute corresponding to a command, or a value corresponding to an attribute of a command.

32. The method of claim 30, further comprising generating the URI according to a predetermined syntax represented by an Augmented Backus-Naur form comprising:

```
app-uri = app-scheme ":" app-data
app-scheme = ALPHA *( ALPHA / DIGIT / "+" / "-" / "." )
app-data = [app-command-list]
app-command-list = "?" command-data *(";" command-data)
command-data = "?" [command] [";" attributes-list]
command = *( uchar / "/" / ":" / "@" / "!" / "$" / "&" / "'" /
"(" / ")" / "*" / "+" / ";" )
attributes-list = attr-value-pair *("," attr-value-pair)
attr-value-pair = attribute "=" value
attribute = *( uchar / "/" / ":" / "@" / "!" / "$" / "&" / "'" /
"(" / ")" / "*" / "+" / ";" )
value = *( uchar / "/" / ":" / "@" / "!" / "$" / "&" / "'" /
"(" / ")" / "*" / "+" / ";")
uchar = unreserved / pct-encoded
unreserved = ALPHA / DIGIT / "-" / "." / "_" / "~"
pct-encoded = "%" HEXDIG HEXDIG
``` wherein the app-scheme comprises the scheme name portion,
wherein the app-data comprises an empty value if the target client device application does not require any commands at start-up,
wherein the app-command-list specifies a list of commands executed in a predetermined sequence by the target client application,
wherein only the attributes-value-pair are passed to the target client application without specifying any command if the target client application supports a default command mode,
wherein the command comprises a target client application-specific command, and
wherein the attribute is specific to the target client application-specific command.

33. At least one processor coupled to a non-transitory memory, the at least one processor configured to generate a uniform resource identifier (URI), comprising:

a first module for generating text indicating a scheme name portion, wherein the scheme name portion corresponds to a target client application;
a second module for appending a colon to the text indicating the scheme name portion; and
a third module for generating a question mark (?) followed by an application linkage portion after the colon, wherein the application linkage portion corresponds to a predetermined point in the target client application corresponding to the scheme name portion, wherein the question mark is placed immediately after the colon in the URI.

34. A computer program product for generating a uniform resource identifier (URI), comprising:
a computer readable medium, comprising:
at least one instruction causing a computer to generate text indicating a scheme name portion, wherein the scheme name portion corresponds to a target client application;
at least one instruction causing the computer to append a colon (:) to the text indicating the scheme name portion; and
at least one instruction causing a computer to generate a question mark (?) followed by an application linkage portion after the colon, wherein the application linkage portion corresponds to a predetermined point in the target client application corresponding to the scheme name portion, wherein the question mark is placed immediately after the colon in the URI.

35. The computer program product of claim 34, wherein the application linkage portion further comprises at least one of a command, or an attribute corresponding to a command, or a value corresponding to an attribute of a command.

36. The computer program product of claim 34, further comprising a predetermined syntax represented by an Augmented Backus-Naur form comprising:

```
app-uri = app-scheme ":" app-data
app-scheme = ALPHA *( ALPHA / DIGIT / "+" / "-" / "." )
app-data = [app-command-list]
app-command-list = "?" command-data *(";" command-data)
command-data = "?" [command] [";" attributes-list]
command = *( uchar / "/" / ":" / "@" / "!" / "$" / "&" /
"'" / "(" / ")" / "*" / "+" / ";" )
attributes-list = attr-value-pair *("," attr-value-pair)
attr-value-pair = attribute "=" value
attribute = *( uchar / "/" / ":" / "@" / "!" / "$" / "&" /
"'" / "(" / ")" / "*" / "+" / ";" )
value = *( uchar / "/" / ":" / "@" / "!" / "$" / "&" /
"'" / "(" / ")" / "*" / "+" / ";")
uchar = unreserved / pct-encoded
unreserved = ALPHA / DIGIT / "-" / "." / "_" / "~"
pct-encoded = "%" HEXDIG HEXDIG
``` wherein the app-scheme comprises the scheme name portion,
wherein the app-data comprises an empty value if the target client device application does not require any commands at start-up,
wherein the app-command-list specifies a list of commands executed in a predetermined sequence by the target client application,
wherein only the attributes-value-pair are passed to the target client application without specifying any command if the target client application supports a default command mode,
wherein the command comprises a target client application-specific command, and wherein the attribute is specific to the target client application-specific command.

37. An apparatus for generating a uniform resource identifier (URI), comprising:
  means for generating text indicating a scheme name portion, wherein the scheme name portion corresponds to a target client application;
  means for appending a colon (:) to the text indicating the scheme name portion; and
  means for generating a question mark (?) followed by an application linkage portion after the colon, wherein the application linkage portion corresponds to a predetermined point in the target client application corresponding to the scheme name portion, wherein the question mark is placed immediately after the colon in the URI.

* * * * *